Figure 1:
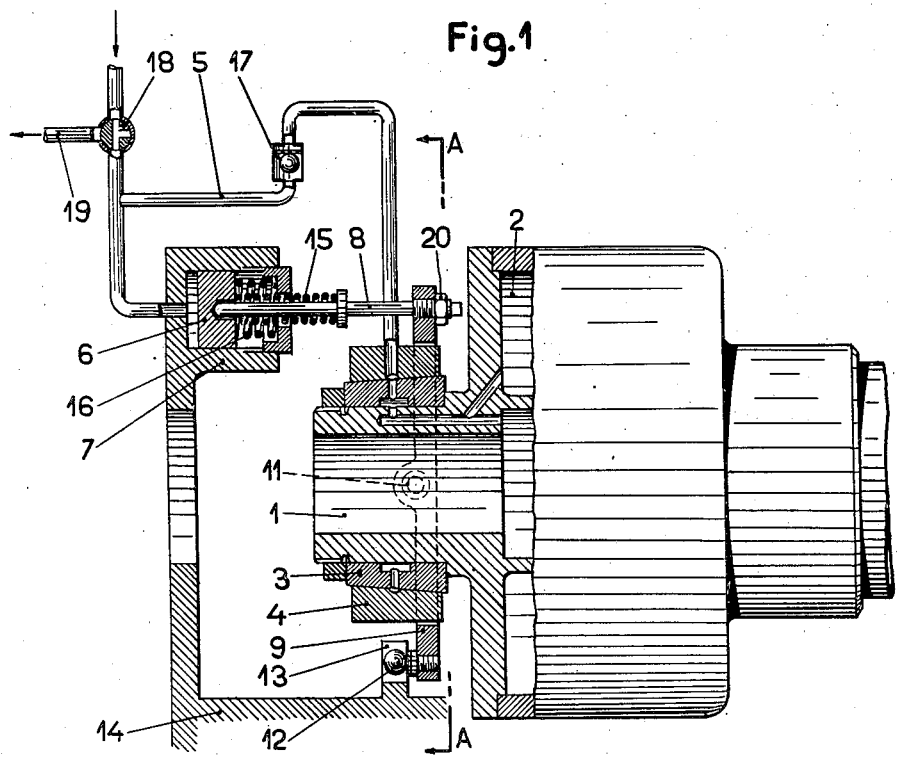

Inventor:
EMIL REZLER

Patented July 26, 1949

2,477,142

UNITED STATES PATENT OFFICE 2,477,142

SWIVEL PIPE JOINT

Emil Rezler, Prague-Smichov, Czechoslovakia, assignor to Limited Company, formerly The Skodaworks Plzen, Prague, Czechoslovakia, a corporation of Czechoslovakia Application May 14, 1946, Serial No. 669,726
In Germany August 2, 1943

Section 1, Public Law 690, August 8, 1946
Patent expires August 2, 1963

3 Claims. (Cl. 285—97.3)

1

The admission of pressure air into the rotating air cylinder in machine-tools, e. g. into the air cylinder of the chucking device, is effected in hitherto familiar devices by means of a distributor socket which latter is immobile and surrounds the rotating pivot of the clamping cylinder.

In such arrangements it is essential to provide for a perfect packing of the socket on the rotating pivot so as to reduce air losses to a minimum. In those cases where the working spindle whereon the air cylinder is fixed turns at smaller speeds and more particularly in such cases where the pivot is of a small diameter, i. e. for smaller circumferential speeds, the solution of the problem of a satisfactory packing of said socket meets no particular difficulties.

The problem of a satisfactory packing of said socket is much more difficult to solve in arrangements containing a pivot of a large diameter, especially in the case of modern high-speed revolver lathes wherein the material wherefrom the respective objects are to be turned, is passing in rod shape through the hollow spindle. The diameter of the distributing sleeve is thereby excessively increased so that the circumferential speed at high turning speeds is very considerable. The pivot of the clamping cylinder is excessively heated and there occurs the risk of socket seizing owing to the decreased clearance.

The substantial drawbacks of the hitherto known packing arrangements of the sleeve in the cases of large diameters and high turning speeds consist in the intricate design of the packing, in the considerable loss of working energy owing to the excessive friction occurring between the sleeve and the pivot, in the high air losses due to leakage and in the unequal clearance at various turning speeds owing to the uneven heating of both frictioning parts.

The above mentioned drawbacks are eliminated by the arrangement according to the present invention. The chief feature thereof consists therein that the packing is brought about by means of a simple conical surface of such an apex angle that any risk of self-clamping is avoided. The advantage of such tapered contact surface over a cylindrical one consists therein that if by being heated at higher turning speeds the pivot presents a diameter more enlarged than is the diameter of the socket sleeve no risk of seizing occurs in contradistinction with cylindrical surfaces. In the arrangement according to the present invention the socket is axially displaceable so that the clearance between the pivot and the socket is maintained at a minimum and at con-

2 stant size. In such an arrangement wherein the certain minimum clearance is always smaller than in the case of a cylindrical socket and wherein by such small clearance only a trifling amount of air escapes, the rotating pivot is gliding on an air bolster almost without any mechanical friction. The resulting axial force produced by the air pressure within the above mentioned clearance, is equalized by the pressure upon the socket resulting from the same source as the air pressure in the clearance and coming from an auxiliary cylinder. Thereby a satisfactory balance is attained between the axial forces even at substantial fluctuations of the air pressure, as is frequent in practise, thus ensuring a constant minimum clearance necessary for avoiding seizing of the pivot even at different air pressures.

If no pressure air is admitted through the socket and if there is no overpressure in the clearance the pressing on of the socket onto the pivot is automatically interrupted by means of the auxiliary cylinder, so that, in this case, too, seizing is avoided. In such case the socket is released so that friction losses are small.

Figure 2:
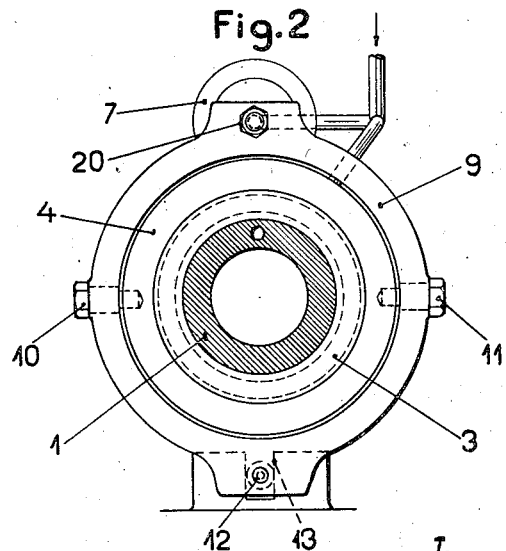

The accompanying drawing shows, merely by way of example, an embodiment of the object of this invention. Fig. 1 is a longitudinal section of the distribution socket in connection with the air cylinder and Fig. 2 a cross sectional view on the line A—A in Fig. 1.

Referring now to the figures, a conical ring 3 is pressed upon the pivot 1 of the air cylinder 2, said conical ring presenting a bearing surface to the socket 4 where through pressure air is introduced from the pipeline 5 into said air cylinder 2. The socket 4 is pressed against said ring 3 by the piston 6 of an auxiliary cylinder 7 the piston rod 8 of which is connected to an annular disc 9 whose pivots 10, 11 are engaged in openings of said socket 4, said annular disc bearing through a spherical pivot 12 against the recess 13 of the bracket 14 fixed on the head stock whereby any mutual angular displacement of said annular disc 9 and said socket 4 is prevented.

The air for said auxiliary cylinder 7 is introduced from the same piping 5 as the air for the socket 4 so that the air pressure is identical.

In case there is no air admitted through said socket 4 the piston is in its left-hand rest position and said socket 4 is slightly urged against the conical ring merely through the action of a spring 15.

Since it is difficult to predetermine the proper size of said auxiliary cylinder 7, it is preferable to choose a somewhat larger diameter of said cylinder and to keep the force brought about by its piston 6 within certain convenient limits through the action of an adjustable spring 16.

It is well known to spray oil automatically into the air at the entrance of pressure air devices, said oil having the purpose of protecting the respective surfaces and of lubricating said surfaces. This well known principle has been utilized according to the present invention for automatically lubricating the conical surface during that working period when the air is left out of the air cylinder. Air draining out of the cylinders is carried out through such displacement of the control organ 18 that the piping 5 is connected to the exhaust 19. The arrangement according to the present invention is such that a return valve 17 is provided in that part of the piping which leads to the air cylinder 2, said valve allowing introduction of air into the air cylinder but preventing any escape of the air from the air cylinder 2 through said piping into the exhaust 19. In the case of air draining, therefore, air escapes merely from the auxiliary cylinder 7 into the exhaust 19 so that in such case said socket 4 is urged against said conical ring 3 only through the pressure of said spring 15. The axial component of the overpressure in the conical surface displaces said socket so far to the left until said piston 6 is held up by the bottom of said cylinder 7. By the clearance thus occurring between said socket and said pivot the air escapes out of the air cylinder 2 into the free air, the oil contained in this air being caught on the bevel surfaces. By means of a setting screw 20 the clearance occurring during the air draining can be adjusted so as to ensure a satisfactory velocity of air escape and a maximum of oil being caught at the frictional surfaces.

Thanks to such arrangement resulting in automatic lubrication of the socket by that oil which otherwise would uselessly escape into the free air together with the air from the air cylinder, a further substantial advantage is attained as against those known arrangements where the socket is to be hand-lubricated with fresh oil, this feature presenting an absolute reliability and regularity of lubrication as well as an essential saving in lubricating material.

The embodiment of the object of this invention illustrated in the accompanying drawing for the introduction of pressure air is designed for a single-acting cylinder. However, by providing two or three identical sockets in side-by-side arrangement the number of air suppliers may be increased according to requirements.

It is to be understood that the embodiment described and illustrated has been chosen merely by way of example and that various modifications of constructional details may be introduced without departing from the spirit and scope of the present invention.

Having thus described my invention and illustrated its use, what I claim as new and desire to secure by Letters Patent is:

1. In an arrangement for the introduction of pressure air into the rotating air cylinder of machine tools the combination comprising a distributing socket attached to the pressure air pipeline and having an inner bearing surface of conical shape adapted to support the conformably shaped pivot of the rotating air cylinder, the apex angle of the cone being of such size as to avoid self-clinching, and an auxiliary air cylinder acting through its piston and transmission means in axial direction upon said socket and pressing the same upon the conical pivot, said auxiliary air cylinder being supplied with air of the same pressure as said socket.

2. In an arrangement for the introduction of pressure air into the rotating air cylinder of machine tools according to claim 1, wherein the diameter of the auxiliary air cylinder is exceeding somewhat the value necessary to keep the distributing socket and the conical pivot in airtight relationship.

3. In an arrangement for the introduction of pressure air into the rotating air cylinder of machine tools according to claim 1, wherein the diameter of the auxiliary air cylinder is exceeding somewhat the value necessary to keep the distributing socket and the conical pivot in airtight relationship, the piston in said auxiliary air cylinder being counteracted by an adjustable spring.

EMIL REZLER.

REFERENCES CITED

The following references are of record in the file of this patent:

UNITED STATES PATENTS

| Number | Name | Date |
| --- | --- | --- |
| 1,295,503 | Hooper | Feb. 25, 1919 |
| 2,364,133 | La Roza | Dec. 5, 1944 |